(12) United States Patent
Yekutiely et al.

(10) Patent No.: US 9,848,720 B2
(45) Date of Patent: Dec. 26, 2017

(54) BEVERAGE SIP REGULATING APPARATUS AND RELATED METHODS

(71) Applicant: PERSIP LABS LTD, Kohav-Yair (IL)

(72) Inventors: Barak Yekutiely, Kohav-Yair (IL); Margalit Yekutiely, Kohav-Yair (IL)

(73) Assignee: B.Y.M.Y. HOLDING & MANAGEMENT LTD, Kohav-Yair (IL)

( * ) Notice: Subject to any disclaimer, the term of this patent is extended or adjusted under 35 U.S.C. 154(b) by 0 days.

(21) Appl. No.: 14/736,330

(22) Filed: Jun. 11, 2015

(65) Prior Publication Data

US 2016/0360907 A1    Dec. 15, 2016

(51) Int. Cl.
*A47G 19/22*   (2006.01)
*G06F 17/30*   (2006.01)
*G06Q 20/14*   (2012.01)
*G06Q 50/12*   (2012.01)
*F25D 3/08*    (2006.01)

(52) U.S. Cl.
CPC ..... *A47G 19/2266* (2013.01); *A47G 19/2227* (2013.01); *F25D 3/08* (2013.01); *G06F 17/30368* (2013.01); *G06F 17/30867* (2013.01); *G06Q 20/145* (2013.01); *G06Q 50/12* (2013.01); *A47G 19/2288* (2013.01)

(58) Field of Classification Search
CPC ..... A47G 19/22; A47G 2200/16; A47J 36/24; A47J 36/2411; A47J 36/2416; A47J 36/2422; A47J 36/2427; A47J 36/2433; A47J 36/2444; A47J 36/245; A47J 36/2455; A47J 36/2461; A47J 36/2466; A47J 36/2472; B67D 3/0022; B67D 2210/00099; B67D 2210/00102; B67D 2210/00104; B67D 2210/00118; B65D 81/18
See application file for complete search history.

(56) References Cited

U.S. PATENT DOCUMENTS

| | | | |
|---|---|---|---|
| 4,320,626 A | | 3/1982 | Donnelly |
| 5,397,031 A | * | 3/1995 | Jensen ................ B67D 3/0022 222/146.5 |
| 5,544,489 A | | 8/1996 | Moren |
| 5,562,941 A | * | 10/1996 | Levy ...................... A23F 3/163 426/433 |

(Continued)

OTHER PUBLICATIONS

BOS, "NAPA Wine Chiller" http://www.originalbos.com/products/napa.

(Continued)

*Primary Examiner* — Andrew Perreault
(74) *Attorney, Agent, or Firm* — Soroker Agmon Nordman

(57) ABSTRACT

The subject matter of the present application discloses a beverage sip regulating apparatus connectable to a beverage container, the beverage sip regulating apparatus, comprising: an entrance port through which beverage enters the beverage sip regulating apparatus; a beverage compartment for receiving a sip amount of beverage from the beverage container; a spout through which the beverage flows out of the beverage sip regulating apparatus; and, a regulation system for regulating one or more predetermined characteristics of the beverage stored in the beverage compartment.

10 Claims, 12 Drawing Sheets

(56) References Cited

U.S. PATENT DOCUMENTS 6,434,955 B1  8/2002  Ng et al.

OTHER PUBLICATIONS

Ravi, "The instant wine refresher" Canada. http://www.ravisolution.com/en/ravi.html.
Blitz Chiller, "rapid beverage cooler" http://www.blitzchiller.com/.
Spin Chill. "Cold Drinks in One Minute" http://spinchill.com/?utm_expid=72796365-12.0RpRxXzSQKSpK0TcEE119w.0.
V-Tex Technology, "Ice Cold Drinks in Seconds" http://www.v-tex-technology.com/.
AliExpress, "usb wanner cooler heater,usb cup warmer" http://www.aliexpress.com/item/free-shipping-MOQ-1PCS-usb-warmer-cooler-usb-heater-usb-cup-warmer-usb-cooler/518693297.html.
AliExpress, "Mini USB Fridge Cooler heater Gadget ,USB Refrigerator" http://www.aliexpress.com/item/free-shipping-New-Mini-USB-Fridge-USB-Cooler-USB-Gadget-USB-Refrigerator/478908380.html.
AliExpress, "Refrigerator Mini Fridge soft drink Food Warmer Car Cooler" http://www.aliexpress.com/item-img/Mini-Fridge-Food-Warmer-Car-Cooler-0-5-Liter-Portable-Travel-Cooler-New/609199665.html.
Zeo Tech, "Champagne Cooler" http://www.zeo-tech.de/index.php/en/developments/mobile-cooling/champagne-cooler.
Zeo Tech, "Disposable Can Cooler—CanCooler" http://www.zeo-tech.de/index.php/en/developments/mobile-cooling/cancooler-disposable-can-cooler.
Cooper Cooler' "Rapid Beverage Chiller" http://coopercooler.com/.
Dysphagia, 18:196-202 (2003) Aug. 2003, H.T. Lawless et al; "Gender, Age, Vessel Size, Cup vs. Straw Sipping, and Sequence Effects on Sip Volume" http://link.springer.com/article/10.1007%2Fs00455•002-0105-0.
Techcrunch, Posted Jun. 2, 2015 by Sarah Buhr "HidrateMe Is A Connected Wales Bottle That Will Glow When You Need to Take a Sip" http://techcrunch.com/2015/06/02/hidrateme-is-a-connected-water-bottle-that-will-glow-when-you-need-to-take-a-sip/#.0zodk5:ImWb.
TechHive, Jul. 24, 2014, Jon Phillips, "Why have consumers spent $1 million on Vessyl, an absurd calorie-counting cup?" http://www.techhive.com/article/2457644/why-have-consumers-spent-1-million-on-vessyl-an-absurd-calorie-counting-cup.html.
Around the home, "Yecup 365 travel mug brings drinks to preferred temp—hot or cold" http://newatlas.com/yecup-365-heat-cool-mug/42563/.

* cited by examiner

BEVERAGE SIP REGULATING APPARATUS AND RELATED METHODS

FIELD OF THE INVENTION

The subject matter relates generally to a beverage sip regulating apparatus and methods for regulating a beverage's characteristics.

BACKGROUND OF THE INVENTION

Beverages are enjoyed at certain consumption characteristics, for example certain temperatures, carbonization levels, and the like. The beverage is stored and consumed from a beverage container, which comprises a port through which a consumer may drink the beverage. The consumer may drink the beverage either by drinking the beverage quickly or by sipping it so that the drinking experience lasts longer. The temperature and quality of the beverage being consumed is of high importance to the consumer and dictates the consumption experience. When a consumer drinks a beverage at an optimal temperature, the consumer enjoys the beverage much more than at other times.

Some methods for regulating a beverage's characteristics are widely known. For example, a common method includes placing ice cubes in a beverage to maintain the beverage's cold temperature or to cool it. However this manner of cooling the beverage causes dilution of the beverage with water as the ice melts. Another disadvantage is that in order to prepare ice cubes from water a significant amount of preparation time is required in order to freeze the water ahead of use.

Artificial ice cubes made from metal or plastic allow reuse and do not cause dilution of the beverage, however the preparation time required is still long prior to use.

Products such as the wine chiller manufactured by Ravi (http://ravisolution.com/en/) enable cooling wine as it is being poured out of a wine bottle. The wine chiller requires cooling in a refrigerator or freezer prior to use, and cannot function without prior cooling. Furthermore, the wine chiller does not allow customization of the beverage temperature. All of the described methods require long term refrigeration of the beverage cooling elements (ice or artificial ice) thus also lead to excessive and wasteful energy consumption.

Other products for cooling a beverage operate by externally cooling the entire beverage container. This form of cooling the beverage requires waiting a lengthy period of time prior to drinking the beverage, and the beverage cannot be enjoyed immediately. Some of the products for cooling a beverage comprise a USB connection to enable connecting the product to a computer or USB port. The product is used to cool a beverage, such as a can or a bottle, and the USB connection provides a power source to continually cool the beverage, e.g. while the user is working on the computer. In some cases, the product is battery operated and completely encloses the beverage container. These products cool the entire container, and require waiting a long period of time until the beverages reaches the desired drinking temperature.

Additional methods for cooling a beverage container are based on adsorption of water vapor into zeolite under a vacuum. For example, this method is demonstrated by Zeo-Tech GmbH for cooling champagne bottle and a soda can using an external disposable device. In both cases, the process can take over 10 minutes for the beverage container to reach an acceptable temperature for drinking and lacks temperature regulation control.

Another variety of products allow cooling a beverage's container by spinning the container in ice and thus cooling the beverage in the container faster. However, this method also requires the use of ice cubes and is not convenient.

Consumers prefer a specific range of temperatures for their drinks. For example, coffee is preferably consumed at a temperature greater than 71 degrees Celsius, whereas soda is preferably consumed at a temperature lower than 15 degrees Celsius.

Experiments have been performed to examine the effects of cup size, gender, age, and parameters of sipping on sip volume of a beverage consumed by a consumer. Increasing the size of a container from 150 to 600 ml increased the volume of a sip by about 15%. Males took larger sips, and had a significantly larger maximum oral capacity than females. However, in a second group of taller females and shorter males, the difference in sip size between genders was minimized.

A second experiment examined sip size from a cup and from straw drinking. The experiment was to show the effects of sequential sipping, i.e. one to five sips, personal characteristics (height, weight), age, and gender on a sip volume. Height proved to be a good predictor of individual differences in sip volume. Cup drinking produced larger sip volumes than straw drinking, but only in a group of adults. Volume per sip decreased as more sips were taken by the consumer. A reasonable guide for sipping from a cup is about 25 ml per sip for males and 20 ml per sip for females. However, this estimation varies as a function of cup size, straw sipping, and sequential sipping.

In order to regulate the temperature of a beverage inside a container to a certain degree there is a need to place the beverage container in a refrigeration system. In addition one may also provide better insulation to the container, to slow the rate at which the beverage temperature reverts to a surrounding temperature. The beverage container itself may comprise a system that enables regulating the temperature of the beverage within the container. All temperature regulating systems for beverage containers require large quantities of energy to regulate the beverage temperature in the container so as to provide a unified temperature to the total amount of the beverage contained within the container. Such temperature regulation may require a long time duration, especially when the beverage volume is large and far from a desired temperature, and especially if the beverage container is exposed to ambient temperature. The time duration required to cool a beverage results in the beverage losing its quality while the beverage container is opened or exposed to ambient temperature. For example, the consumption experience of a beer is less than optimal once a beer container is opened, since the beer is exposed to air and the temperature of the beer is increased.

Other characteristics of the beverage also effect the drinking experience of the consumer, for example the carbonization level of the beverage, the sugar content of the beverage, acidity of the beverage or the like. Once the container is opened these characteristics change due to exposure to the outside environment and reduce the quality of the beverage. For example, once a soda container is opened or the soda is poured into a glass, the carbonization level of the beverage decreases as the gas escapes into the environment, causing the beverage to become flat. In another example, when milk-based beverages are exposed to the environment, their acidity levels change and cause the beverage to become less enjoyable and in some cases harmful to drink when exposed for too long.

SUMMARY

It is an object of the subject matter to disclose a beverage sip regulating apparatus connectable to a beverage container, the beverage sip regulating apparatus, comprising an entrance port through which beverage enters the beverage sip regulating apparatus; a beverage compartment for receiving a sip amount of beverage from the beverage container; a spout through which the beverage flows out of the beverage sip regulating apparatus; and, a regulation system for regulating one or more predetermined characteristics of the beverage stored in the beverage compartment.

In some cases, the regulation system comprises a temperature regulating component for regulating the temperature of beverage received in the beverage compartment.

In some cases, the beverage sip regulating apparatus further comprising a processor to control operation of electronic components of the beverage sip regulating apparatus; one or more characteristic sensors to measure one or more predetermined characteristics of the beverage; an energy source for powering the electronic components of the apparatus.

In some cases, the beverage sip regulating apparatus further comprising a communication unit to receive configuration data from an electronic device, the configuration data comprising desired beverage characteristic settings for beverage contained in the beverage sip regulating apparatus or usage settings of said apparatus.

In some cases, the beverage sip regulating apparatus further comprising a user interface to enable input of configuration data for regulating the beverage in the beverage compartment.

In some cases, the user interface displays the configuration data for regulating the beverage.

In some cases, the beverage sip regulating apparatus is connectable to a top portion of the beverage container.

In some cases, the beverage sip regulating apparatus further comprising a clamping element to connect to a rim of the beverage container.

In some cases, the beverage sip regulating apparatus is connected to a bottom portion of the beverage container.

In some cases, the beverage sip regulating apparatus further comprising one or more nozzles through which the beverage from the beverage container is inserted into the beverage compartment; and one or more enveloping elements to envelope the beverage container so to prevent the apparatus from disconnecting from the beverage container.

In some cases, the one or more enveloping elements are one or more adjustable straps.

In some cases, the one or more enveloping elements is an elastic sleeve.

In some cases, the beverage sip regulating apparatus further comprising a movement detection unit for obtaining movement data of the container and beverage sip regulating apparatus, wherein the movement data provides information about a drinking rate of the beverage by the consumer.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

DETAILED DESCRIPTION

Figure 1A:
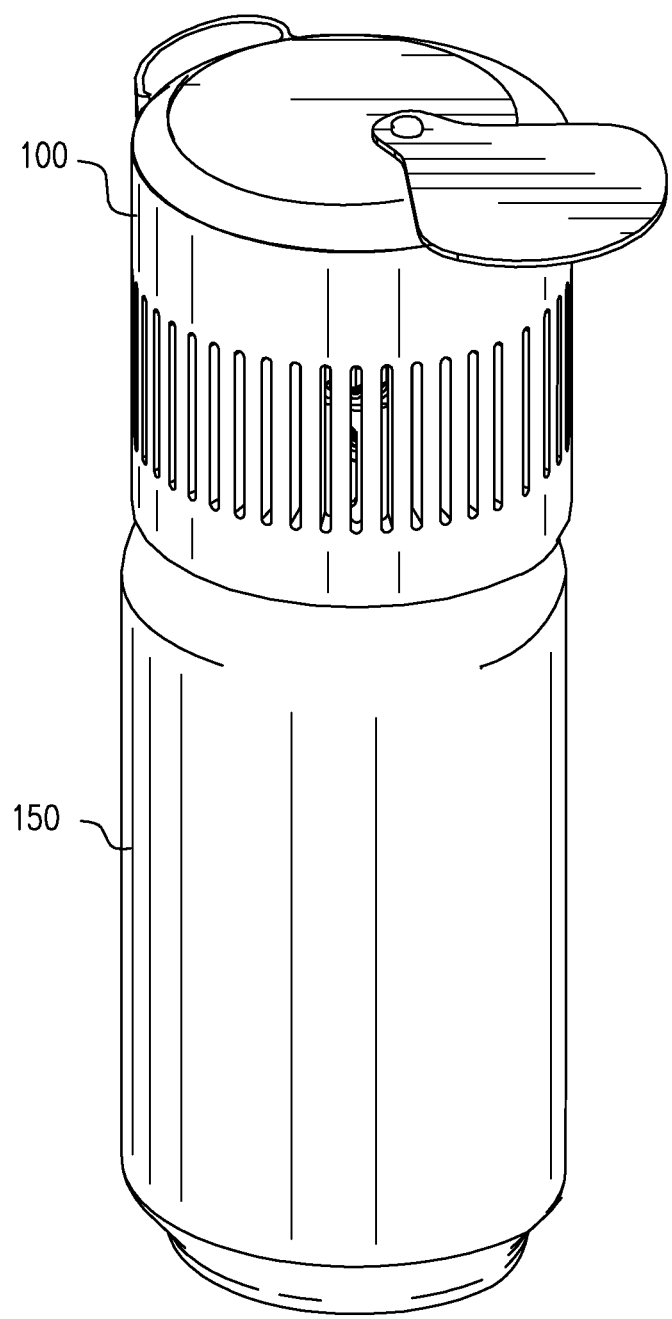
FIGS. 1A-1B show a beverage sip regulating apparatus connectable to a top of a container, according to some exemplary embodiments of the subject matter.

The subject matter relates generally to a beverage sip regulating apparatus for a container, according to some exemplary embodiments.

One technical problem dealt by the disclosed subject matter is providing a consumer of a beverage stored in a beverage container the option of enjoying the beverage over a lengthy period of time, without the beverage losing its quality, for example, the beverage increasing or reducing its temperature.

One technical solution according to the disclosed subject matter is connecting a beverage sip regulating apparatus to the beverage container in which the beverage is stored. The beverage sip regulating apparatus regulates one or more predetermined characteristics of the beverage to maintain the quality of the beverage while the consumer drinks the beverage. For example the beverage sip regulating apparatus regulates a temperature of the beverage that the consumer drinks, a carbonization level of the drink, etc. The beverage sip regulating apparatus stores a small volume of the beverage, for example, enough beverage to be sipped. The beverage sip regulating apparatus regulates the one or more predetermined characteristics of the beverage stored by increasing or reducing a characteristic of the one or more predetermined characteristics. Each time the consumer drinks the beverage stored in the beverage sip regulating apparatus, the beverage in the beverage sip regulating apparatus is replaced with beverage from the beverage container to which the beverage sip regulating apparatus is connected.

Another technical problem dealt with by the disclosed subject matter is enabling the consumer of the beverage to control the one or more predetermined characteristics according to a consumer's specifications.

Another technical solution according to the disclosed subject matter is enabling the beverage sip regulating apparatus to provide an interface, which enables adjusting and customizing the one or more predetermined characteristics of the beverage. The interface may be connected to the beverage sip regulating apparatus or may be an application on a mobile device, which communicates with the beverage sip regulating apparatus. The beverage sip regulating apparatus provides the consumer via a user interface with continuous updates related to the one or more predetermined characteristics of the beverage as well as the ability to change the beverage sip regulating apparatus configuration data or settings per beverage type, sip temperature, sip volume, and/or other beverage and/or sip characteristics. The user interface may be integral to the beverage sip regulating apparatus and/or may be implemented on a remote device, such as a mobile phone or other wireless computing device which may communicate with the beverage sip regulating apparatus. The beverage sip regulating apparatus receives commands from the consumer regarding the manner of use of the apparatus, e.g., to change the one or more settings, predetermined characteristics or configurations of beverage sip regulating apparatus according to a consumer's configuration or selection.

Embodiments of the invention may include an article, such as a non-transitory computer or processor readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein. The processes and displays presented herein are not inherently related to any particular computer or other apparatus. Various general purpose systems may be used with programs in accordance with the teachings herein, or it may prove useful to construct a dedicated device to perform the desired method. It will be appreciated that a variety of programming languages may be used to implement the embodiments of the invention as described herein.

Figure 1B:
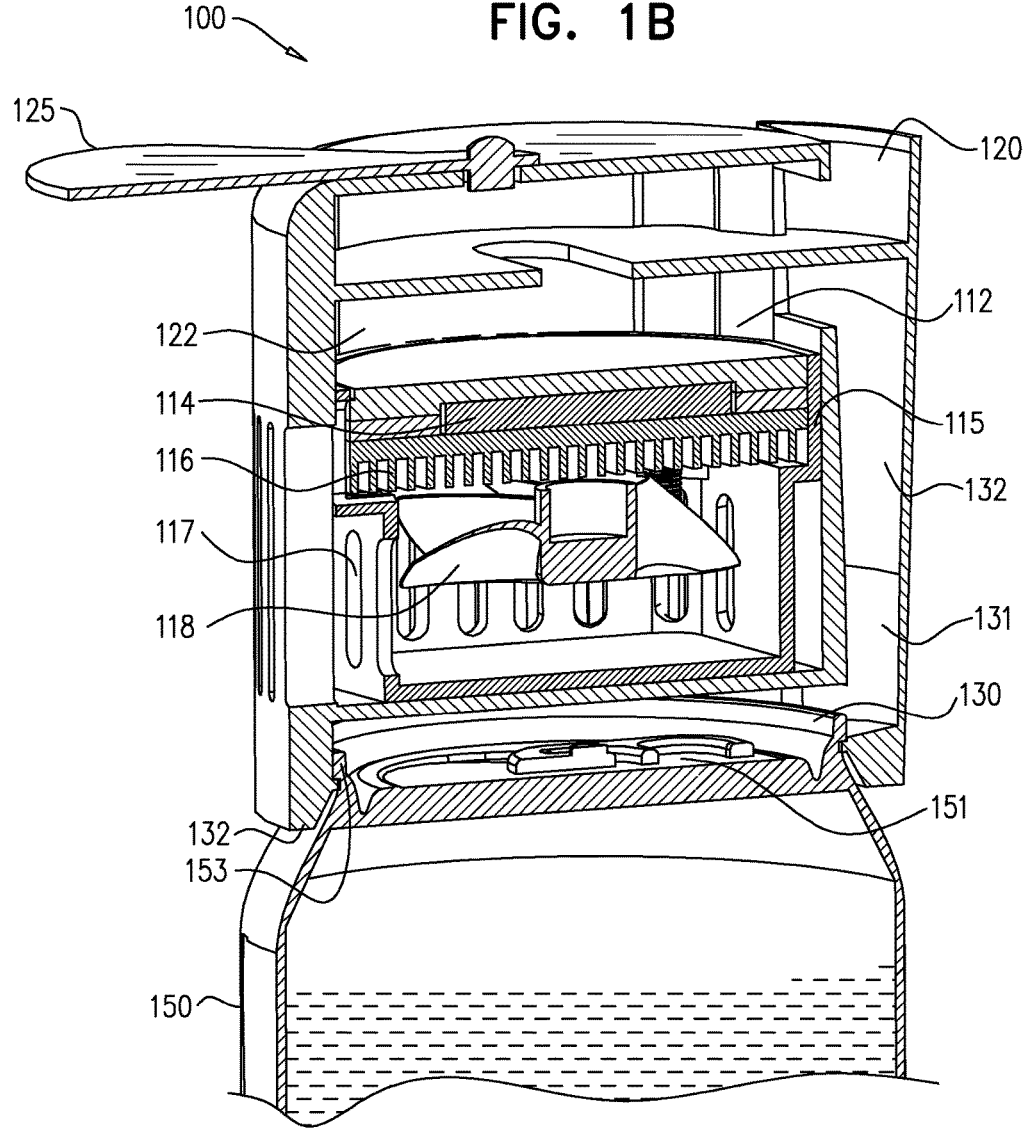

FIGS. 1A-1B show a beverage sip regulating apparatus connectable to a top of a beverage container, according to some exemplary embodiments of the subject matter. FIG. 1A shows the beverage sip regulating apparatus 100 connected to the beverage container 150 according to some exemplary embodiments of the subject matter. The beverage container 150 stores a beverage that a consumer wishes to drink, for example, a soda, a coffee, or the like. The beverage container 150 may be a can, a cup, a bottle, or the like. The beverage in the beverage container 150 comprises one or more characteristics, which cause the beverage to be enjoyable by the consumer, for example, the flavor, the temperature, the degree of carbonization, or the like. Once the beverage container 150 is opened and the consumer begins consuming the beverage stored therein, the quality of the beverage deteriorates due to changes in the said characteristics of the beverage.

In the non-limiting exemplary embodiment, the beverage sip regulating apparatus 100 is connected to the top of the beverage container 150 to preserve the beverage such that the consumption experience of the consumer remains consistent until the beverage is completely consumed. The beverage sip regulating apparatus 100 stores a predetermined or configurable volume of the beverage from the beverage container 150 and regulates the beverage throughout the time of the consumption of the beverage. The beverage sip regulating apparatus 100 regulates the beverage to provide the consumer with optimal or preferred consumption characteristic settings, for example, at an ideal temperature for consumption. The beverage sip regulating apparatus 100 may be connected to the beverage container 150 using a pressing motion, or the beverage sip regulating apparatus 100 may be attached using a rotating motion, e.g. screwing the beverage sip regulating apparatus 100 onto the top of the beverage container 150.

FIG. 1B which shows a cross-section of the beverage sip regulating apparatus 100 and the beverage container 150, according to some exemplary embodiments of the subject matter. The beverage sip regulating apparatus 100 comprises a beverage entrance opening 130, which enables beverage to enter through a container port 151 of the beverage container 150. The beverage sip regulating apparatus 100 comprises a connecting element 132, which enables the beverage sip regulating apparatus 100 to be connected to the container 100, for example, the connecting element 132 clamps onto a rim 153 of the beverage container 150. Other connecting elements may be used, and accordingly other methods of connecting the beverage sip regulating apparatus 100 to the beverage container 150.

The beverage sip regulating apparatus 100 comprises an apparatus entrance port 131, which is located over the container port 151 to enable the beverage to flow from the beverage container 150 into the apparatus entrance port 131, when the beverage container 150 is tilted. The beverage sip regulating apparatus 100 comprises a beverage conduit 132 which flows the beverage from the apparatus port entrance port 131 to beverage compartment 112. The beverage compartment 112 receives the beverage that flows into the beverage sip regulating apparatus 100 from the beverage container 150. In some cases, the beverage received in the beverage compartment 112 is at a sip amount, e.g. a predetermined or configurable volume of the beverage which is sipped by the consumer. For example the sip amount is a volume in a range of 20-30 milliliters, or 10-40 milliliters. The beverage compartment 112 stores a predetermined or configurable volume of the beverage that is rapidly regulated according to characteristics of a consumer's desired drinking quality.

The beverage sip regulating apparatus 100 comprise a regulation system 115 which regulates one or more characteristics of the beverage within the beverage compartment 112. The regulation system 115 comprises components that enable regulating one or more predetermined characteristics of the beverage stored in the beverage compartment 112. In some non-limiting exemplary embodiments, the regulation system 115 comprises a carbonization regulation component (not shown), which enables regulating a carbonization level of the beverage in the beverage compartment 112. In other non-limiting exemplary embodiments, the regulation system 115 comprises a pH regulation component (not shown), which enables regulating a beverage pH level.

In some non-limiting exemplary embodiments, the regulation system 115 regulates a beverage temperature. In such embodiments the regulation system comprises a temperature regulating component 114. For example, a thermoelectric Peltier component, zeolite and water in an evacuated chamber component, a compressor refrigeration component, thermal evaporative cooling component, a thin film evaporation component, or a combination thereof. The temperature regulating component 114 heats or cools the beverage in the beverage compartment 112.

In some non-limiting embodiments, the temperature regulating component 114 may be connected to a heat sink 116, which passively cools or heats a temperature plate 122 according to the temperature regulating component 114. The heat sink 116 is designed to maximize the surface area of the temperature plate 122 receiving the heat from the temperature regulating component 114. The temperature plate 122 is attached to the beverage compartment 112 such that the beverage's temperature is changed due to the contact with the temperature plate 122. The temperature plate 122 comprises a surface area that enables the temperature of the beverage in the beverage compartment 112 to be heated or cooled to the desired drinking temperature as rapidly as possible. For example, the temperature plate 122 cools the beverage while the beverage is in the beverage regulation system 112 and in contact with the temperature plate 122. The temperature regulating component 114 comprises a fan 118, which disperses heat generated by the Peltier unit's activity. The regulation system 115 comprises air vents 117 for dispersing the heat generated by the temperature regulating component 114 out of the beverage sip regulating apparatus 100. The temperature regulating component and associated elements (heat sink, fan, etc) may be to increase the energy efficiency of the temperature regulating component and/or decrease the size of the sip regulating apparatus, an evaporative cooling method may also be used as part of the temperature regulating component. The evaporative cooling method may utilize a small amount of water stored in a dedicated water chamber in the sip regulating apparatus. The water stored in the water chamber may be refilled from an external source (tap water etc.) or can be taken (filtered) from the beverage itself during operation of the sip regulating apparatus.

The beverage sip regulating apparatus 100 comprises a spout 120, through which the beverage is consumed by the consumer. To drink the beverage, the beverage container 150 with the beverage sip regulating apparatus 100 may be tilted towards the consumer to enable drinking the beverage in the beverage container 112. As the beverage container 150 and the beverage sip regulating apparatus 100 are tilted for drinking the beverage the beverage flows through an exit conduit 113 and out of the spout 120. In some exemplary embodiments of the subject matter, the beverage sip regulating apparatus 100 comprises a mobile spout cover 125, which can be placed over the spout 120. The mobile spout cover 125 is moved when the consumer wishes to drink and may be placed on the spout 120 to prevent spillage. In some embodiments, the spout 120 may be connected to a utensil such as a straw, through which the consumer drinks the regulated beverage.

Figure 2A:
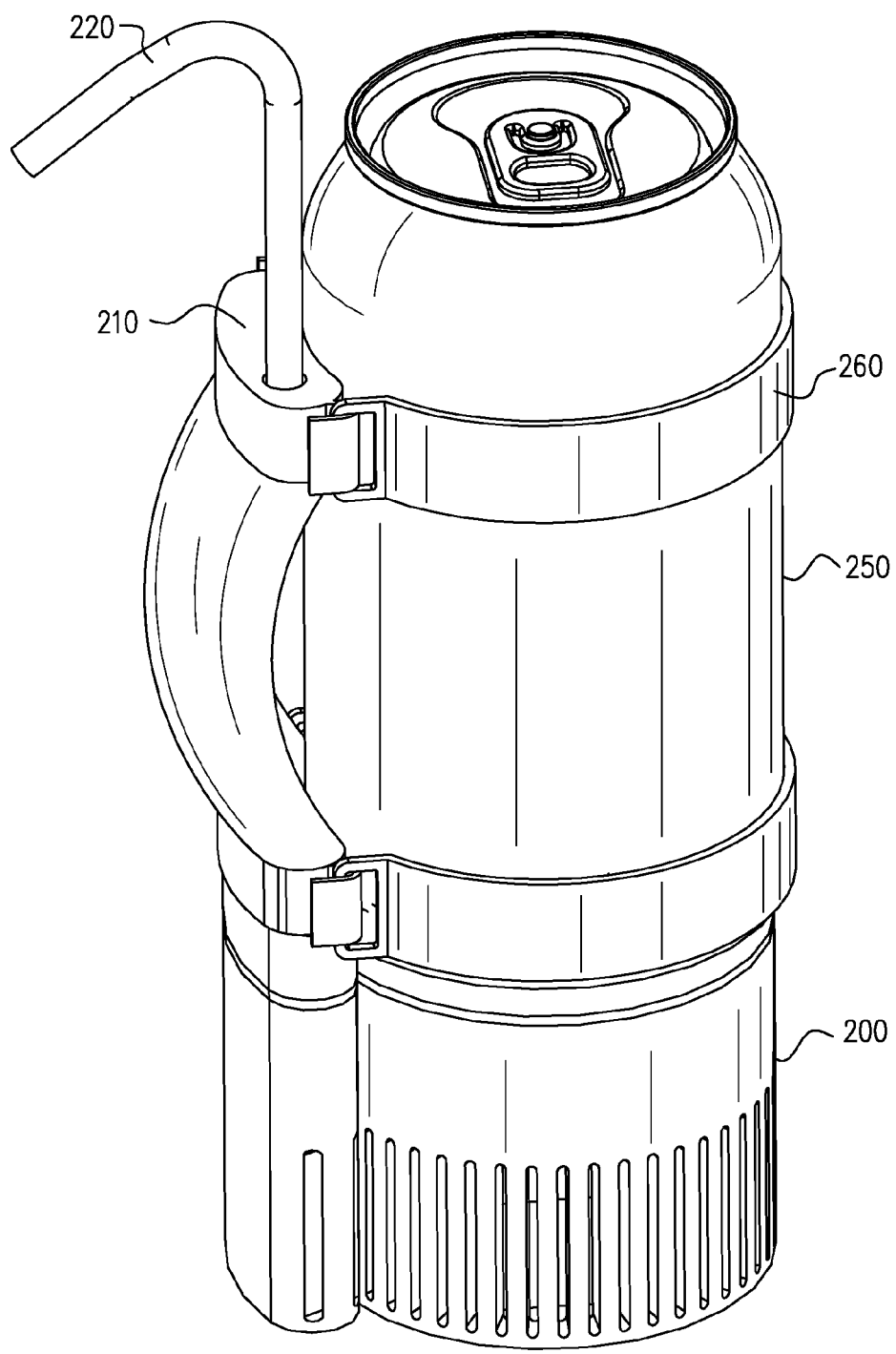
FIGS. 2A-2B show a beverage sip regulating apparatus connectable to a bottom of a container, according to some exemplary embodiments of the subject matter.
Figure 2B:
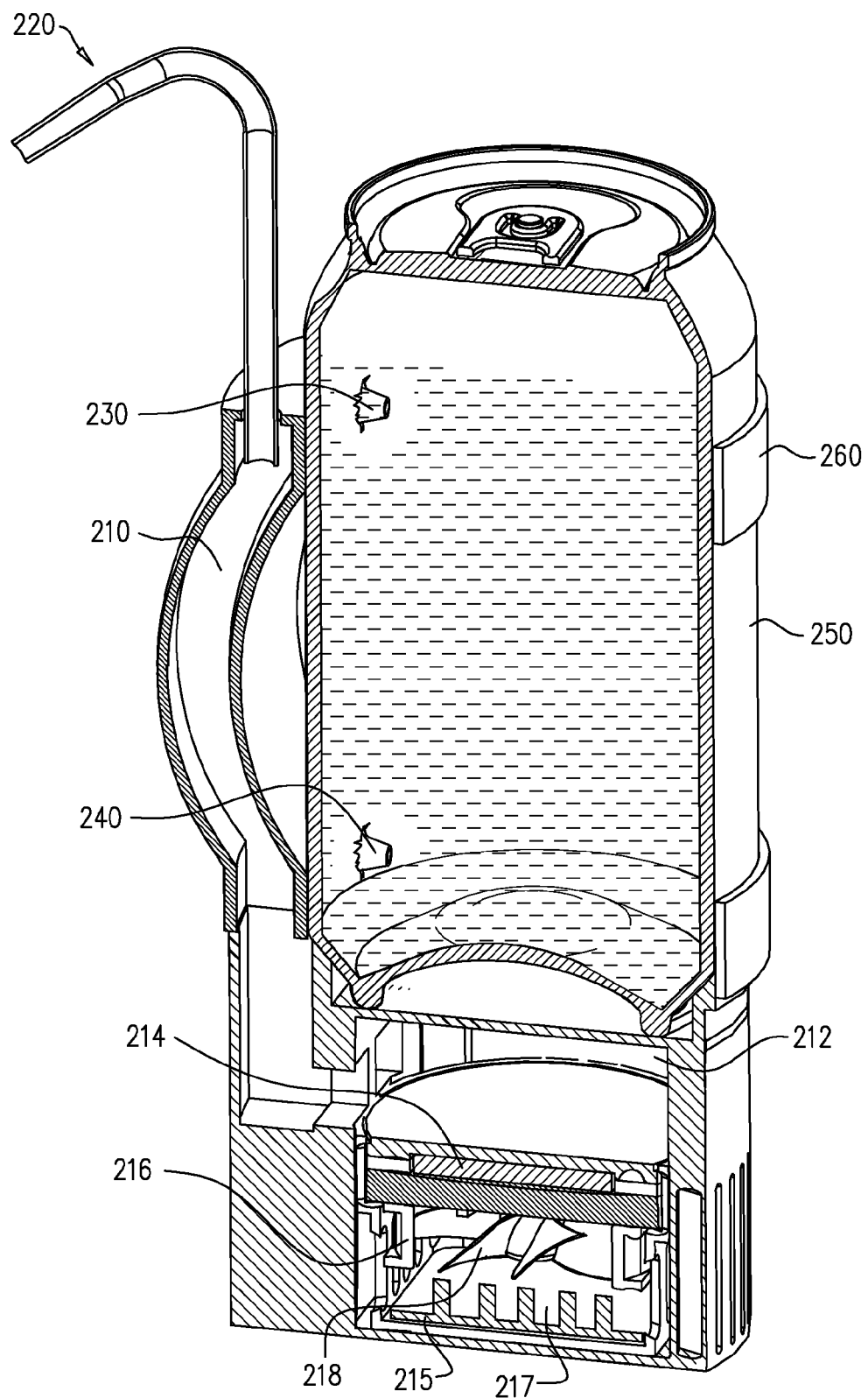

FIGS. 2A-2B show a beverage sip regulating apparatus connectable to a bottom of a beverage container, according to some exemplary embodiments of the subject matter. FIG. 2A shows the beverage regulating apparatus 200 connected to a bottom of the beverage container 250, according to some exemplary embodiments of the subject matter. The beverage sip regulating apparatus 200 comprises a beverage conduit 210, which connects the beverage sip regulating apparatus 200 to a drinking utensil 220, for example a straw. In some non-limiting cases, the beverage sip regulating apparatus 200 comprises one or more enveloping elements 260, which envelope the beverage container 250 and prevent the beverage sip regulating apparatus 200 from disconnecting from the beverage container 200. For example, the one or more enveloping elements 260 may be adjustable straps that are adjustable according to the size of the beverage container 250, or may be an elastic sleeve with an elastic opening into which the beverage container 250 is inserted.

FIG. 2B shows a cutaway of the beverage sip regulating apparatus 200 and the beverage container 250, according to some exemplary embodiments of the subject matter. The beverage sip regulating apparatus 200 comprises one or more nozzles 230, which are inserted into the beverage container 250, for example, by piercing a container wall 251. In this non-limiting case, once the one or more nozzles 230 are inserted into the beverage container 250, the beverage sip regulating apparatus 200 becomes an integral part of the beverage container 250, e.g. the beverage container 250 and the beverage sip regulating apparatus 200 are combined into a single unit consisting of, or composed of elements that together constitute a whole. The one or more nozzles 230 may be connected to the drinking conduit 210 of the beverage sip regulating apparatus 200. The beverage in the beverage container 250 flows through the drinking conduit 210 into a beverage compartment 212 of the beverage sip regulating apparatus 200. The beverage compartment 212 stores the beverage that flows into the beverage sip regulating apparatus 200 from the beverage container 250. The beverage compartment 212 stores a predetermined or configurable volume of the beverage to be rapidly regulated to appropriate characteristics according to the consumer's desired drinking quality.

The beverage sip regulating apparatus 100 comprises a regulation system 215, which regulates one or more characteristics of the beverage within the beverage compartment 212. The regulation system 215 comprises components that enable regulating the one or more predetermined characteristics of the beverage stored in the beverage compartment 212.

In some non-limiting exemplary embodiments, the regulation system 215 regulates a beverage temperature. In such a case the regulation system comprises a temperature regulating component 214 (e.g. Peltier unit), which heats or cools the beverage in the beverage compartment 212. Temperature regulating component 214 is connected to a heat sink 116, which passively cools or heats a temperature plate 222 according to the temperature regulating component 214. The heat sink 216 is designed to maximize the surface area of the temperature plate 222 receiving the heat from the temperature regulating component 214. The temperature plate 222 is attached to the beverage compartment 212 such that the beverages temperature is changed due to the contact with the temperature plate 222. The temperature plate 222 comprises a surface area that enables the temperature of the beverage in the beverage compartment 212 to be at the desired drinking temperature as rapidly as possible. For example, the temperature plate 222 cools the beverage while the beverage is in the beverage regulation system 212 and in contact with the temperature plate 222. The temperature regulating component 214 comprises a fan 218, which disperses heat generated by the temperature regulating component 214. The regulation system 215 comprises air vents 217 for dispersing the heat generated by the temperature regulating component 214 out of the beverage sip regulating apparatus 200.

When the user wishes to drink the beverage in the beverage compartment 212, the user may use the drinking utensil 220 to consume the beverage. The drinking utensil 220 is inserted into the beverage conduit 210 to enable the user to consume the beverage. For example, the drinking utensil 220 may be a straw, through which the user consumes the beverage in the beverage regulation system 212 and the beverage conduit 210.

Figure 3:
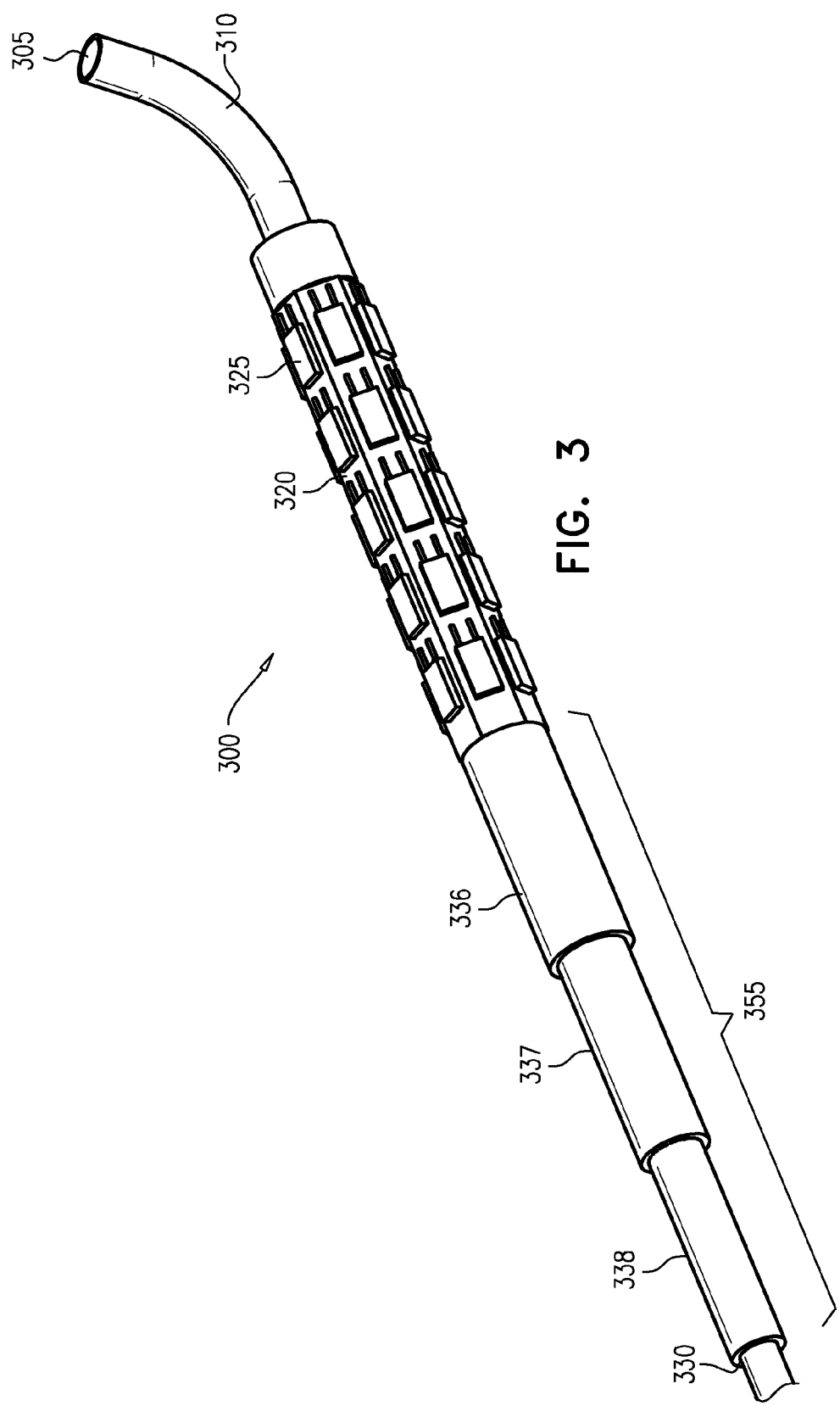
FIG. 3 shows a beverage sip regulating apparatus to be used as a straw, according to some exemplary embodiments of the subject matter.

FIG. 3 shows a beverage sip regulating apparatus to be used as a straw, according to some exemplary embodiments of the subject matter. The beverage sip regulating apparatus 300 may be inserted into an external container (not shown) of a beverage, e.g. into a cup, glass, soda can, bottle, etc. The beverage sip regulating apparatus 300 comprises an apparatus entrance port 330 through which the beverage flows from the external container into the beverage sip regulating apparatus 300. The beverage flows through the apparatus entrance port 330 into a beverage compartment 355. The beverage compartment 355 comprises a thermal film 320, which is used to regulate a temperature of the beverage in the beverage compartment 355. The thermal film comprises one or more thermal units 325, which regulate the temperature of the thermal film. The beverage flows from the beverage compartment 355 through a spout conduit 310 to a spout 305, which enables drinking the beverage contained in the beverage sip regulating apparatus 300.

The beverage compartment 355 may comprise a plurality of sections 336, 337, 338, and the length of the beverage compartment 355 and the volume of beverage which it comprises may be configurable, e.g. varied according to a user's configuration, e.g. by pulling the sections to lengthen the beverage compartment 355, or pushing it to compress the beverage compartment 355 and reduce its length. These sections 336, 337, 338 also enable reducing the space required for storing the beverage sip regulating apparatus 300.

Figure 4:
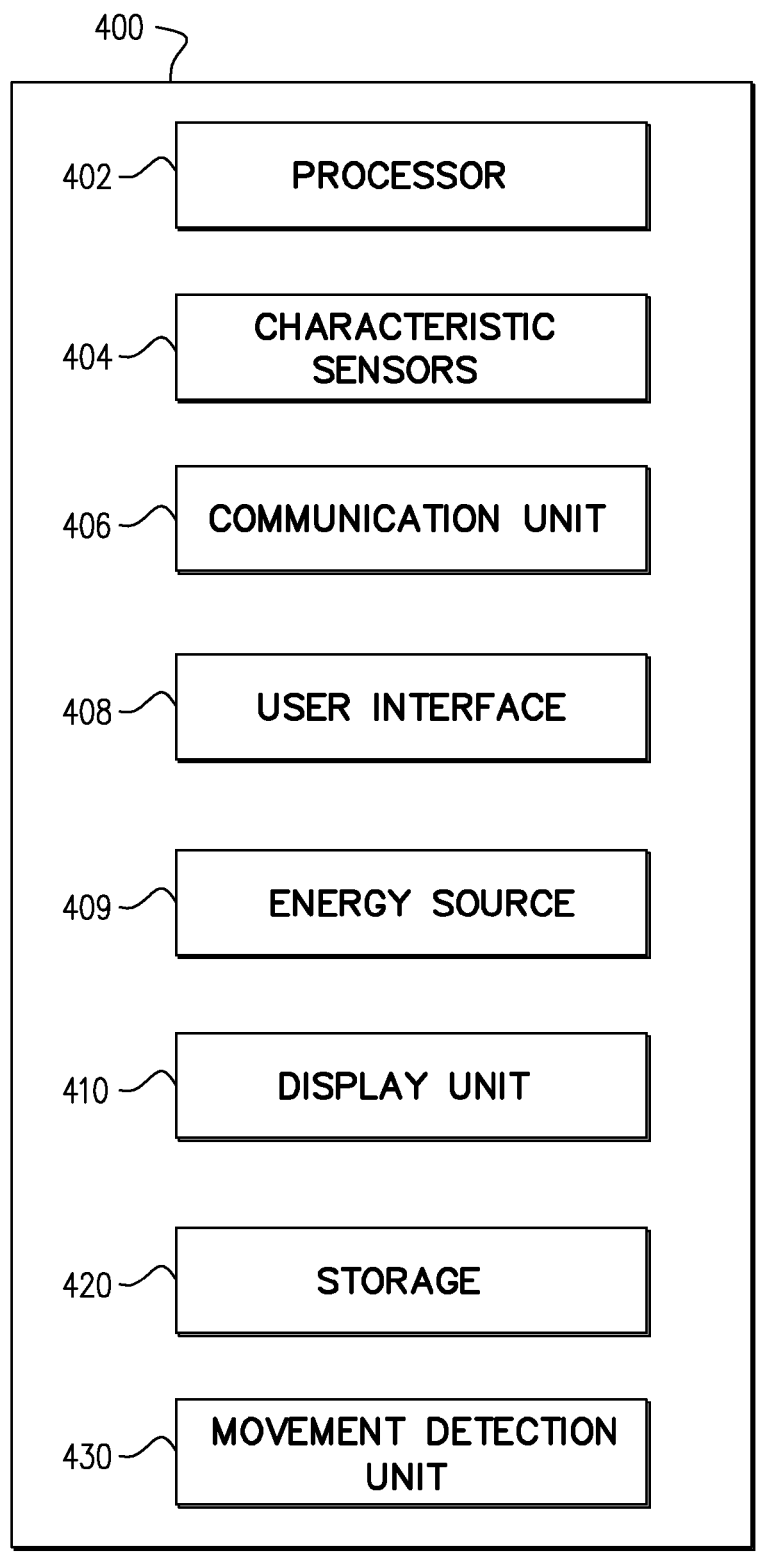
FIG. 4 is a schematic diagram of a beverage sip regulating apparatus, according to some exemplary embodiments of the subject matter.

FIG. 4 shows a beverage sip regulating apparatus, according to some exemplary embodiments of the subject matter. The beverage sip regulating apparatus 400 comprises a processor 402 to control the performance of the beverage sip regulating apparatus 400. The processor 402 controls the functions of various electronic components of the beverage sip regulating apparatus 400. For example, the processor 402 controls regulation components of regulation system 115 of FIG. 1. For example, the processor 402 controls temperature regulating component 114 of FIG. 1 to acquire a desired temperature of the beverage in the beverage compartment 112. The processor 402 may designate a predetermined temperature of 10 degrees Celsius for the beverage in the beverage compartment 112 of FIG. 1, and cause the temperature regulating unit 114 to cool the beverage until it reaches the predetermined temperature.

In some exemplary embodiments of the subject matter, the processor 402 may be operationally connected to a sip control application which may be executed locally (e.g. on the beverage sip regulating apparatus 400) and/or on a remote electronic device, e.g. a mobile phone, and used by a consumer to control the beverage sip regulating apparatus 400. For example, the processor 402 may be operationally connected to a remote sip control application which may be executed on a smart phone or remote computing device, e.g. via communication means such as WiFi, Bluetooth, near field communication, or the like. The sip control application enables the consumer to obtain beverage consumption settings, for example from a beverage business that makes a beverage consumption setting available as downloadable content for use with the beverage sold by the beverage business. The sip control application may further enable the consumer to receive advertisements, coupons, and information relating to beverages made available by one or more beverage business, for example from beverage manufacturers, distributors, or the like.

The beverage sip regulating apparatus 400 comprises one or more characteristic sensors 404, which monitor one or more predetermined beverage characteristics. The one or more characteristic sensors 400 are operationally connected to the beverage compartment 112 to measure the one or more predetermined characteristics of the beverage. The one or more sensors 404 enable the processor 402 to determine when the beverage in the beverage compartment 112 is ready, e.g. optimal, for drinking. For example, the one or more characteristic sensors 404 may include temperature sensors to measure the temperature of the beverage in the beverage compartment 112. In some exemplary embodiments of the subject matter, the one or more characteristic sensors 404 may include pH sensors, pressure sensors, gps sensors, position sensors to determine the angle or orientation that the beverage sip regulating apparatus is held at and/or other types of sensors that may provide the processor 402 with information regarding the characteristics and/or type of beverage that is in the beverage compartment 112 and/or usage habits of the beverage sip regulating apparatus, for example, whether it is a carbonized or a still beverage, and/or the real time status of the beverage sip regulating apparatus, for example, attachment or dis-attachment to the beverage container, beverage is currently being consumed, beverage has been placed on the table, rate of beverage consumption.

The beverage sip regulating apparatus 400 comprises a user interface 408, which enables a user of the beverage sip regulating apparatus 400 to input configuration data, such as regulation settings or commands to the beverage sip regulating apparatus 400. The user interface 408 may comprise a display unit 410, which may display to the user information related to the beverage in the beverage compartment 112 of FIG. 1 or beverage compartment 212 of FIG. 2, such as current data related to the beverage or the one or more predetermined characteristics or settings which were configured for the beverage, the type of beverage, dietary information about the beverage, or the like. For example, the user interface 408 may display that the current temperature of the beverage is 13 degrees Celsius, and that the beverage is lemonade. The user interface may further be configured to display data related to consumption habits of the user, for example the total volume of beverages consumed during a certain time period, statistical data related to usage habits, preferred beverages, preferred configuration data, and the like. Such data may be stored and/or calculated in the beverage sip regulating apparatus, and/or may be provided to the beverage sip regulating apparatus from an external data source, e.g. via a communication unit 406 which is described herein.

Configuration data of the beverage sip regulating apparatus include desired settings of the beverage sip regulating apparatus, for example preferred consumption temperature or temperature range of the beverage stored in the beverage compartment (e.g. beverage compartment 112 of the beverage sip regulating apparatus 100), preferred consumption volume or volume range of the beverage for a single sip, carbonization level of the beverage stored in the beverage compartment, beverage sip regulating apparatus mode of operation, and the like. In some cases, the configuration data of the beverage sip regulating apparatus 400 may enable modifying the manner of use of the beverage sip regulating apparatus 400 according to gender, age, height, weight, or the like. For example, the sip volume may be configurable by a user, or automatically configured according to user data such as gender, age, height, weight, or the like. Furthermore, the sip volume may change according to a hydration mode selected by the user of the beverage sip regulating apparatus 400. In some embodiments, the user interface of beverage sip regulating apparatus 400 may provide a suggested setting of the sip volume according to obtained data related to the user.

In some embodiments, the beverage sip regulating apparatus 400 may comprise one or more indicators to the user, e.g. using Light Emitting Diodes (LED) or the display unit 410, in order to provide an indication to the user that the beverage reached desired settings. For example, a message may be displayed on the display unit 410 that the drink is ready for consumption, an LED or display screen may flash in a certain color, etc.

The beverage sip regulating apparatus 400 comprises a storage unit 420, which enables a consumer to store configuration data which includes one or more beverage consumption settings. The one or more beverage consumption settings are predetermined beverage characteristics that may be stored for use at a later time. For example, a beverage regulation setting of the one or more beverage regulation settings comprises a temperature setting for consuming cold soda, e.g. a temperature range of 4-8 degrees Celsius.

In some exemplary embodiments of the subject matter, the stored settings may be used to customize the mode of operation of the beverage sip regulating apparatus 400. For example, the beverage sip regulating apparatus 400 comprises a beverage consumption setting which is optimized for a sipping mode or a hydration mode. The sipping mode enables a more precise, frequent, and/or accurate regulation of the beverage, as the beverage sip regulating apparatus 400 enables drinking the beverage only when the beverage characteristics are determined to be according to the predetermined settings. The hydration mode may enable a lower regulation level of the beverage by the beverage sip regulating apparatus 400, e.g. the user may consume the beverage even if the desired settings are not reached. This enables a thirsty user to drink the beverage at a faster rate without having to wait. In some cases, the hydration mode is customizable to include a volume of consumption that is optimal for proper hydration, after which the beverage sip regulating apparatus 400 resumes performance in the sipping mode. For example, the hydration mode is provided with a volume of 500 milliliters, which is the volume of beverage the user preferably drinks for immediate hydration. Once the user has consumed the 500 milliliters, the beverage sip regulating apparatus 400 resumes functioning in the sipping consumption mode. In some cases, the settings of each mode are customizable or configurable, such that the beverage sip regulating apparatus 400 is initially configured to operate in the hydration mode, and while the user drinks, the mode of operation gradually switches to the sipping mode.

The beverage sip regulating apparatus 400 comprises a communication unit 406, which enables the beverage sip regulating apparatus 400 to communicate with a remote electronic device (not shown). The remote electronic device may be a smartphone, a laptop, a tablet, or the like. The communication unit 406 may communicate with the electronic device through Wi-Fi, Bluetooth, near field communication, or the like. The electronic device comprises an application, which enables a user of the electronic device to provide commands to processor 402, for example, modifying the desired temperature to which the beverage in the beverage compartment 112 is cooled.

In some exemplary embodiments of the subject matter, the communication unit 406 communicates with a server (not shown), which collects information about the beverages and settings that a consumer applies to the beverage sip regulating apparatus 400. The communication unit 406 transmits beverage information to the server. For example, the communication unit 406 transmits the type of beverage, the beverage consumption setting used by the consumer for the beverage, or the like. In some cases, the communication unit 406 receives advertisement information from the server which is displayed on the use interface 408 to inform the consumer of suggested beverage consumption settings or configuration data, or other beverages recommended to be consumed using the beverage sip regulating apparatus 400. In some non-limiting embodiments the advertisement information may be provided on the display unit 410 of user interface 408. Additionally or instead, communication unit 406 may transmit the advertisement information to the electronic device to be displayed on the electronic device's display unit.

The beverage sip regulating apparatus 400 comprises an energy source 409 for providing energy to the components of the beverage sip regulating apparatus 400, for example a battery, a rechargeable battery, a power outlet that may be connected, for example, to the power outlet of a car or a home, etc.

The beverage sip regulating apparatus 400 comprises a movement or position detection unit 430, which detects movement, motion or position changes of the beverage sip regulating apparatus 400. The movement detection unit 430 for example may be an accelerometer, gyroscope, a device which combines accelerometer and gyro capabilities, or the like. The movement detection unit 430 detects when the container 150 of FIG. 1 and the beverage sip regulating apparatus 400 is in movement or detects a change in the angle the apparatus 400 is held or in its position, for example movement of the beverage sip regulating apparatus 400 for drinking the beverage contained therein. The movement detection unit 430 enables the beverage sip regulating apparatus 400 to collect information about drinking habits and behavior of the consumer. Such information may be stored, for example transmitted to a remote server, and analyzed for various purposes. In one example, the information may be used to automatically modify the mode of operation of the beverage sip regulating apparatus 400. For example, when the consumer moves the container 150 frequently to drink from it, the movement detection unit 430 detects the frequent movement and modifies the mode of operation of the beverage sip regulating apparatus 400 to provide the beverage more frequently, e.g. using hydration mode. In some exemplary embodiments, movement data related to the movement detected by the movement detection unit 430 is transmitted by the beverage sip regulating apparatus 400 to a sip service system, such as described in FIGS. 5-8 herein. The movement data may be analyzed by the sip service system, and data relating to drinking habits of the consumer may be generated. The sip service system may further provide services and information that may interest the consumer about use of the beverage sip regulating apparatus 400. Generated data relating to drinking habits may include, for example, the consumer's preferred rate of consumption a soft drink, and the sip service system may provide a recommendation of specific drinks or types of beverages that are preferably or optimally consumed according to the consumer's consumption rate.

Figure 5:
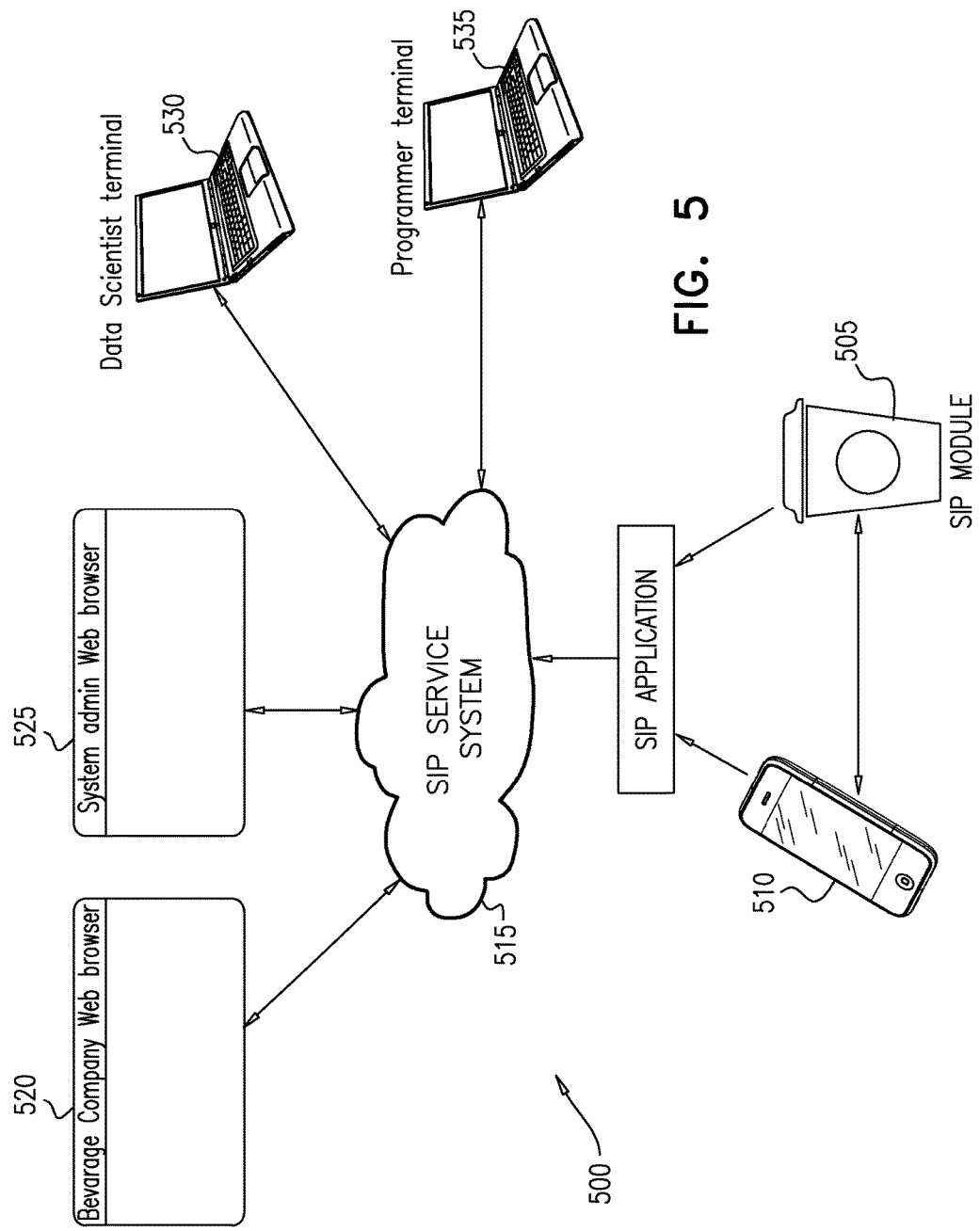
FIG. 5 shows an environment enabling use of a sip control application with a beverage sip regulating apparatus, according to some exemplary embodiments of the subject matter.

FIG. 5 shows a system 500 enabling use of a sip control application 508 with a beverage sip regulating apparatus, according to some exemplary embodiments of the subject matter. The system 500 comprises a sip control application 508, which includes software for controlling the performance of the beverage sip regulating apparatus 400 of FIG. 4, for example software executed by the processor 402 of FIG. 4.

The sip control application 508 may include a set of computer executable instructions, and may be stored, in some embodiments, on a storage unit of an electronic device 510, e.g. a mobile phone, a smartphone, laptop, tablet, or the like. The sip control application 508 enables the electronic device 510 to relay information between the beverage sip regulating apparatus 400 and a sip service system 515, which collects information about the use of the beverage sip regulating apparatus 400 and consumer habits or behavior.

In other exemplary embodiments of the subject matter, the sip control application 508 may be stored on a storage unit of beverage sip regulating apparatus 400 and may be executed by, for example, processor 402 of FIG. 4 to enable the beverage sip regulating apparatus 400 to communicate directly with the sip service system 515 (e.g. without requiring an electronic device 510 as an intermediary). A user of the beverage sip regulating apparatus 400 may interact with the sip control application 508 through the user interface 408 of FIG. 4, which may be displayed for example on the display unit 410 of FIG. 4 of the beverage sip regulating apparatus 400. The display screen 410 may be a touch screen enabling the user to interact with the sip control application 508 by inputting commands for controlling the beverage sip regulating apparatus 400 via the touch screen of the beverage sip regulating apparatus 400.

The sip service system 515 enables the sip control application 508 to interact with one or more services, administrators, components. The sip service system 515 receives information regarding the manner of use of the beverage sip regulating apparatus 400 from the sip control application 508, for example when the user configures the beverage sip regulating apparatus 400 before consuming a beverage, or periodically, e.g. as may be defined by a manufacturer of the beverage sip regulating apparatus 400 or by configuring the sip control application 508. Properties of user behavior may be collected as a manner of user, for example configurations or settings determined by the user to configure the operation of the beverage sip regulating apparatus 400 may be received, logged and collected (e.g. by computer-implemented software which may be executed or operated by, for example, a processor or controller of sip service system 515). For example, the sip service system 515 receives information regarding the beverage consumption settings being used with the beverage sip regulating apparatus 400. The sip service system 515 provides data available to be used with the sip control application 508, for example, providing downloadable content to be used with the beverage sip regulating apparatus 400 or the sip control application 508.

The sip service system 515 may communicate with or may be operationally connected to a programmer terminal 535, which enables developing supplemental application modules and updates for the sip control application 508. The supplemental application modules and updates for the sip control application 508 are made available through the sip service system 500 to the sip control application 508. For example, updates may include optimized beverage consumption settings that enhance the beverage drinking experience of the consumer. The programmer terminal 535 may include or may be operationally connected to, an article, such as a non-transitory computerized system or processor-readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

The sip service system 515 may communicate with or may be operationally connected to a data scientist module or terminal 530, which manages and analyzes data collected by the sip service system 515. The collected data may be used to extract information to improve development and optimization of the sip control application 508, in order to benefit a consumer's experience when using the sip control application 508 and the beverage sip regulating apparatus 400. For example, the collected data may be the movement data obtained from the movement detection unit 430 of FIG. 4, which may provide information about a drinking rate of the consumer. The data scientist module or terminal 530 may include or may be operationally connected to, an article, such as a non-transitory computerized system or processor-readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

The sip service system 515 enables a beverage company module 520 to communicate with the sip control application 508. The beverage company module 520 enables a beverage business, such as a beverage manufacturer, distributor, or the like, to communicate with the sip control application 508 to provide advertisements, messages, downloadable content or the like. The beverage company module 520 enables the beverage company to view data relating to the actual use of the beverage sip regulating apparatus 400 and preferred consumption habits of its consumers. For example, the beverage company may view how many users are using the beverage sip regulating apparatus 400 to drink the company's beverages. In some cases, the beverage company module 520 enables the beverage company to provide advertisements, messages to be displayed by the sip control application 508 on the electronic device 510 or on a display unit 410. The beverage company module 520 may include or may be operationally connected to, an article, such as non-transitory computerized system or processor-readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

The sip service system 515 may be operationally connected to a system administrator module 525, which regulates and moderates the sip service system 515. The system administrator module 525 enables a system administrator to manage integration or communication between the sip service system 515 and a third party platform which integrates with the sip service system 515, for example, an iPhone platform. The system administrator module 525 moderates data of the sip service system 515, for example, the customer information, billing information of customers, or the like. The system administrator module 525 may include or may be operationally connected to, an article, such as a non-transitory computerized system or processor-readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Figure 6:
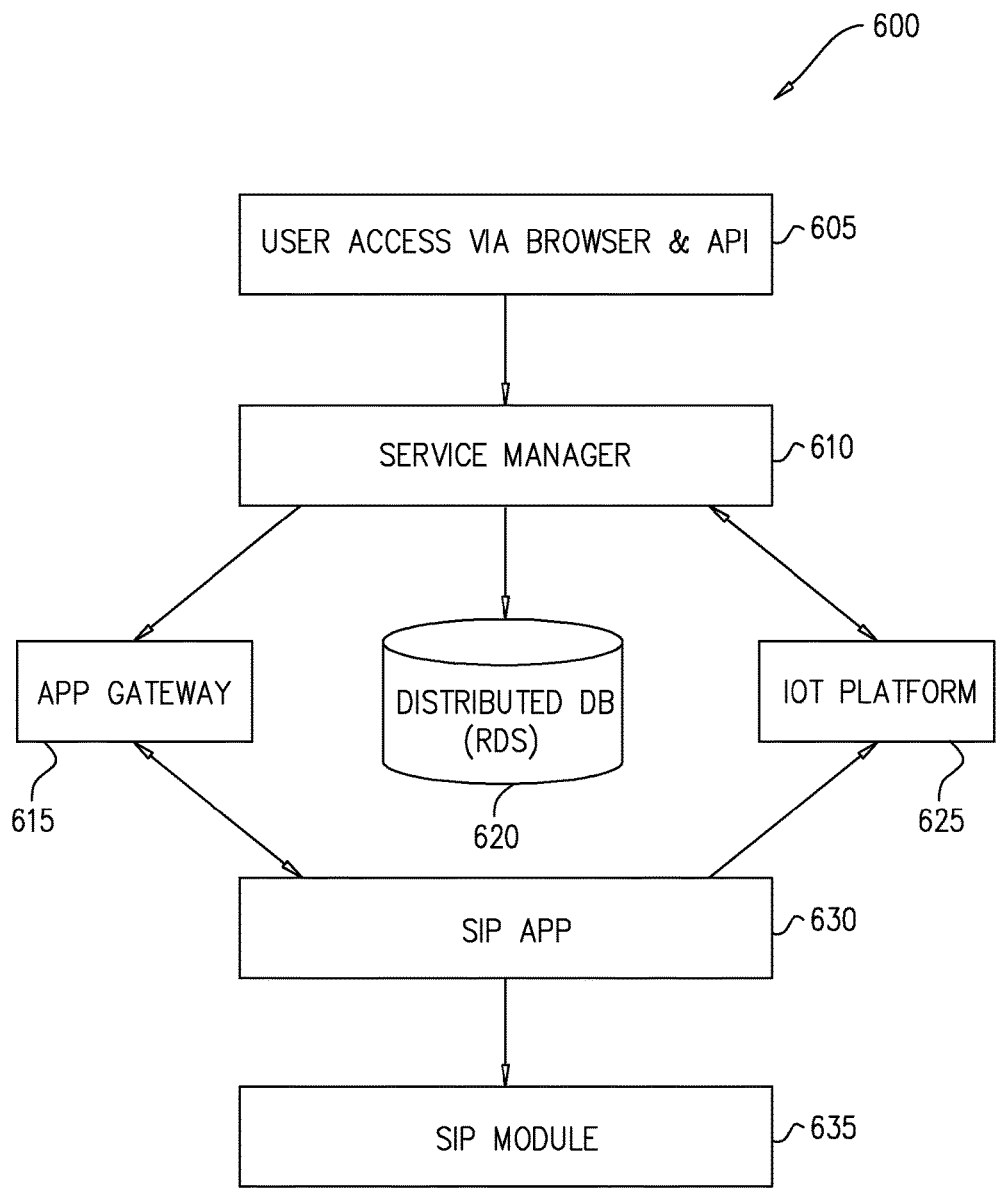
FIG. 6 shows a sip service system, according to some exemplary embodiments of the subject matter.

FIG. 6 shows a sip service system 515, according to some exemplary embodiments of the subject matter. The sip service system 515 comprises a service manager module 610, which manages and synchronizes the operation of a sip service system, e.g. sip service system 515 of FIG. 5. The service manager module 610 may include or may be operationally connected to, an article, such as a non-transitory computerized system or processor-readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

A user of the sip control application 508 accesses the sip control application 508 through a user access module 605, e.g. through a web browser or through an application programming interface ("API"). The service manager module 610 processes and performs administrative commands and requirements, such as updating the sip service system 515, removing unnecessary data, or the like.

The service manager 610 comprises an application gateway 615, which enables one or more registered users of the sip control application 508 to access the sip service system 515. The application gateway 615 enables access from the sip control application 508 regardless of the computerized platform on which the sip control application 508 is executed. For example, the application gateway 615 enables access to the sip service system 515 from a sip control application 508 which may be executed on the beverage sip regulating apparatus 400, or on an iPhone®, a Samsung Galaxy® smartphone, a tablet, or the like. The application gateway 615 enables communication between the sip control application 508 and the sip service system 515 to enable user management and customization of the sip control application 508, billing services to the user of the sip control application 508, synchronization of identification and credentials required for activation of the application content, or the like. The application gateway 615 may include or may be operationally connected to, an article, such as a non-transitory computerized system or processor-readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

The service manager 610 may also be operationally connected to control an internet of things ("IOT") platform 625, for example "ArrayEnt", Xively", ThingSpeak", or the like. The IOT platform 625 enables aggregation of data uploaded from one or more devices connecting to the sip service system 515 through the sip control application 508. The service manager 610 may be operationally connected to a distributed database 620, which stores data obtained from sip control application 508. The IOT platform 625 may include or may be operationally connected to, an article, such as a non-transitory computerized system or processor-readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Figure 7:
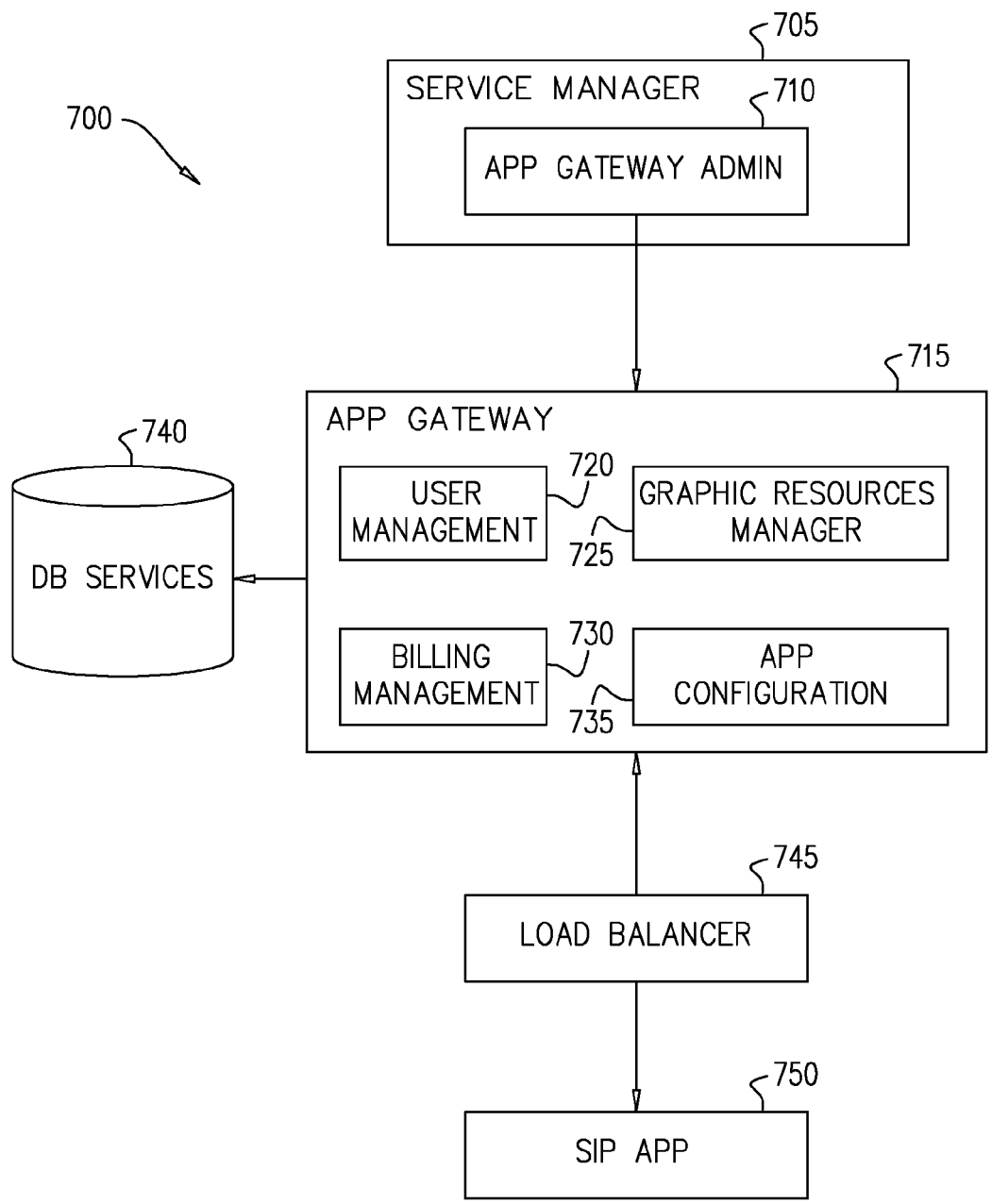
FIG. 7 shows an application gateway of a sip service system, according to some exemplary embodiments of the subject matter.

FIG. 7 shows an application gateway of a sip service system, according to some exemplary embodiments of the subject matter. The sip service system 700 comprises the application gateway 715, which enables the sip service system 700 to communicate with a sip control application 508. The application gateway 715 communicates with a service manager module 705. The sip service system 700 comprises an application gateway administration module 710, which controls the communication between the service manager module 705 and the application gateway 715. The application gateway 715 may include or may be operationally connected to, an article, such as a non-transitory computerized system or processor-readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

The application gateway 715 may comprise a remote user management module 720, which enables a user of a sip service system, e.g. sip service system 515 of FIG. 5 to log in and perform various tasks. For example, a user may sign in and be provided with one or more services, such as, reviewing beverages consumed using the beverage sip regulating apparatus 400, view advertisements for one or more beverages, view, purchase or download one or more optimized beverage settings, or the like.

The application gateway 715 may comprise a graphic resources manager module 725, which provides the graphics for the sip control application 508. The graphic resources manager 725 allows dynamic configuration of the graphics, for example, a splash screen to be displayed while the sip control application 508 is being loaded or initiated on a user's device, displaying a beverage advertisement, a background theme for the sip control application 508, and the like. In some exemplary cases, the optimized beverage settings may provide an improved sip setting, for example, the optimal sip volume, according to a consumer's age, gender, personal characteristics, or the like.

The application gateway 715 may comprise a billing management module 730, which controls billing and purchasing related to the sip control application 508, e.g. new features of the sip control application 508, new beverage regulation settings, or the like. The billing management module 730 generates an invoice, which may be provided to the user. The billing management module 730 receives the payments from the user and performs the transaction to receive the payment provided by the user.

The application gateway 715 may comprise an application configuration module 735, which enables the sip service system 515 to communicate necessary updates and information, to and from the sip control application 508.

The application gateway 715 communicates with or connects to a database service 740. The database service 740 is designed to handle business queries requests and provide beverage marketers with reports, business analytics, and the like which may be requested by the beverage marketers.

The application gateway 715 communicates with or connects to load balancer 745, which maintains the connections of one or more registered users to the application gateway 715. The load balancer 745 may recognize an IP address of the electronic device used to access the sip control application 508, and enables a rapid connection to the application gateway according to the IP address.

The application gateway 715 may include software instructions or computer-executable instructions, which may be implemented on a computerized system, a processor, an application server. In some embodiments, one or more components of the application gateway 715 (such as service manager module 705, remote user management module 720, graphic resources manager module 725, billing management module 730, application configuration module 735, database service 740, and/or load balancer 745) may be implemented in a single server, or may be implemented in a distributed system, for example on remote systems or units which are in operational communication with each other through a network.

Figure 8:
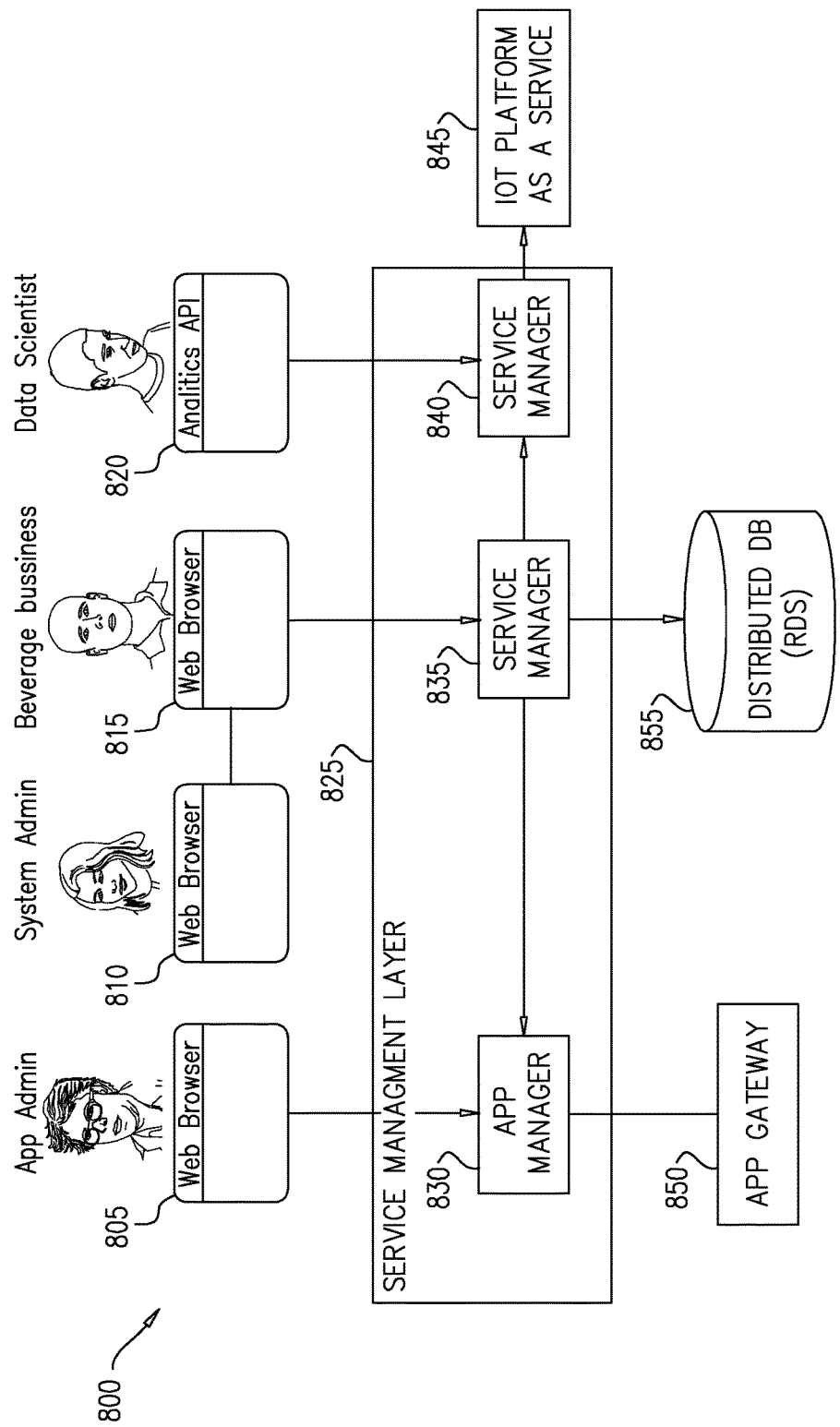
FIG. 8 shows a service management module, according to some exemplary embodiments of the subject matter.

FIG. 8 shows a service management module, according to some exemplary embodiments of the subject matter. The service management module 825 controls a sip service system, e.g. sip service system 515 of FIG. 6. The service management module 825 is accessible to an application administrator 805, which manages the application permissions, user types, controls level of services and performance, or the like. The service management module 825 connects to a beverage business 815, which enables the a system administrator 810 of the beverage business 815 to provide advertisement and review data obtained from the beverage sip regulating apparatus 400 of FIG. 4. The service management module 825 connects to a data scientist 820, which analyzes the data obtained from the beverage sip regulating apparatus 400. The service management module 825 may include or may be operationally connected to, an article, such as a non-transitory computerized system or processor-readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

The service management module 825 comprises an application manager 830, which manages the sip control application performance. The application manager 830 enables creation, deletion and editing of new sip service system users, grants them login and user permissions, controls beverage regulation settings, which are used to regulate the one or more characteristics of the beverage in the beverage sip regulating apparatus 400.

The service management module 825 comprises a service manager 835, which synchronizes the components of the sip service system 515. The service manager 835 implements the administrative components of the sip service system 515. For example, the service manager 835 synchronizes between a data analytics manager 840 and the application manager 830.

The service management module 825 comprises a data analytics manager 840, which manages interactions with an TOT platform 845 and operations related to the data of the sip control application 508 of FIG. 5 stored by the TOT platform 845. The data analytics manager 840 maintains credentials required for connecting with the IOT platform 845. The data analytics manager 840 may create the IOT platform 845, which is used by the user of the sip control application 508. In some cases, the data analytics manager 840 provides a browser-based or web user interface for using the sip control application 508 through a web browser, for example, when logging into the sip control application 508 from a remote electronic device on which the sip control application 508 has not been activated. The data analytics manager 840 may allow filtering of data, and may provide data query results and reports by enquiring entities, such as one or more beverage businesses. For example, preventing the one or more beverage businesses from viewing data regarding the use of the beverage sip regulating apparatus 400 of a user who requested to maintain privacy, and that no information be made available to the one or more beverage businesses. The service management module 825 may be operationally connected to an application gateway 850. The service management module 825 may be operationally connected to a distributed database 855. The distributed database 855 collects information related to a registered user, for example, gender, age, demographic data, history of consumption of the user, manner of use of the beverage sip regulating apparatus 400, or the like. In some cases, the distributed database 855 collects information regarding beverages consumed by the registered user, such as the type of beverage consumed, location of consumption, response of the registered user to an advertisement, or the like.

Figure 9:
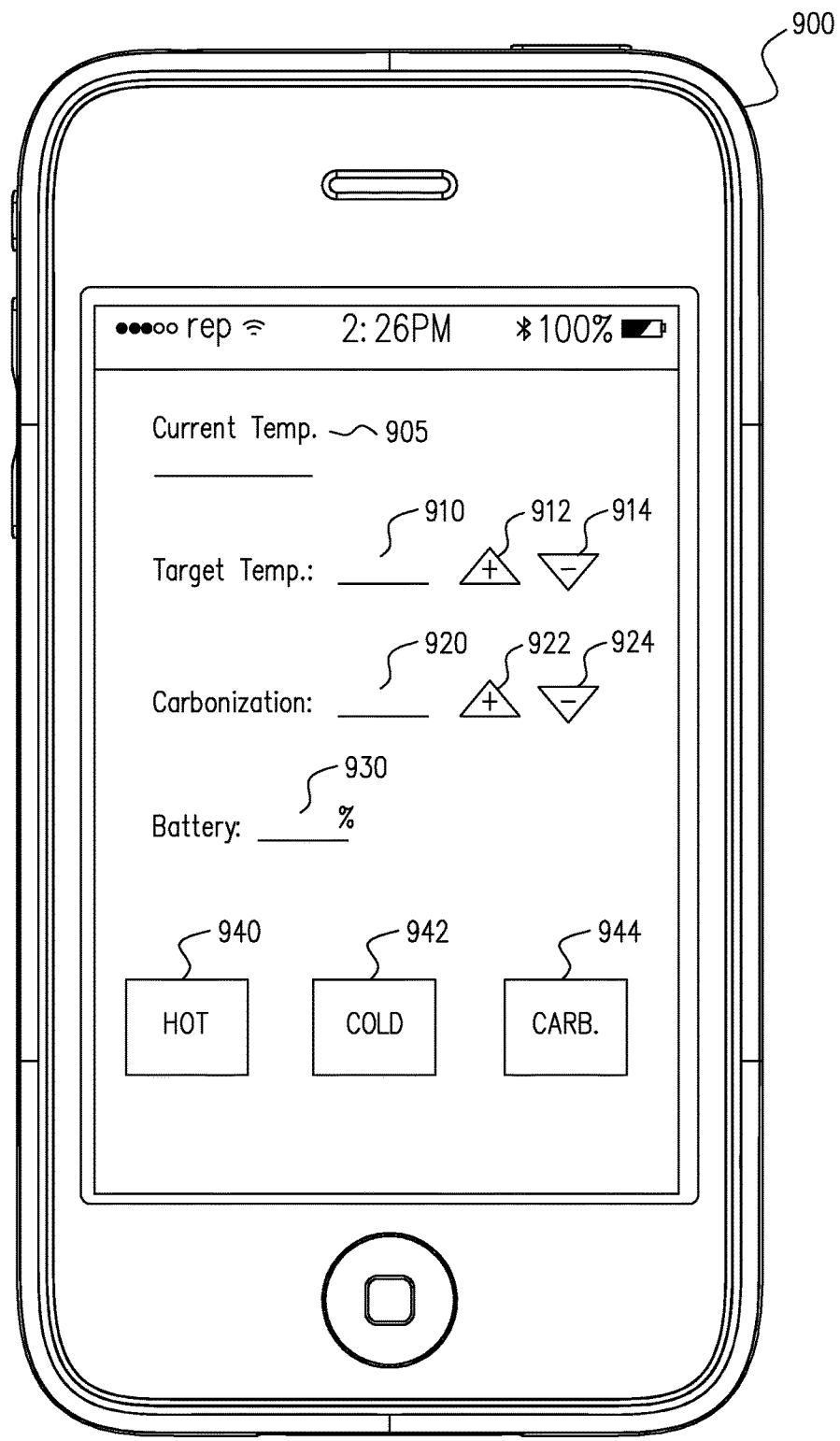
FIG. 9 shows a user interface for an application for controlling a beverage sip regulating apparatus, according to some exemplary embodiments of the subject matter; and, FIG. 10 shows a method for regulating a beverage characteristics, according to some exemplary embodiments of the subject matter.

The service manager module 800 handles requests from the sip service system 700. The service manager 800 synchronizes between the data analytics manager 840 and the application manager 830 of the sip service system 700. The service manager module 800 passes JOT credentials to the application manager 830 and updates the application manager 830 regarding new data that needs to be reported to the JOT platform 845 due to new requests from the data analytics manager 840. The service manager module 800 may communicate advertisement offers to registered users, configure system information monitoring and alerts, collect system information, display system information and send notifications or alerts to a moderator or administrator of the sip service system 700. The service manager module collects business intelligence information related to the operations of the sip service system 700. The system manager module 800 enables analysis of collected information related to the sip service system 700. FIG. 9 shows a user interface for a sip control application operable for controlling a beverage sip regulating apparatus, according to some exemplary embodiments of the subject matter. The user interface 900 is displayed on an electronic device, e.g. electronic device 510 of FIG. 5. The user interface 900 enables a user of the electronic device to control functions of the beverage sip regulating apparatus 400 of FIG. 4. The user interface 900 may include a display 905 which displays a parameter or characteristic of the beverage, e.g. the current temperature of the beverage according to the beverage temperature measured by a characteristic sensor (e.g. one or more characteristic sensors 404 of FIG. 4). The user interface 900 may display a target temperature 910, which is a temperature at which the user of the electronic device 510 prefers to consume the beverage. The user interface may display notifications or alerts to a registered user, for example, notifications relating to drinking volume levels, hydration levels, excess alcoholic consumption, sugar level in the beverage, or the like. The user interface 900 comprises a temperature increase button 912 and temperature decrease button 914, which enable the user of the electronic device to increase or decrease the temperature of the beverage in the beverage sip regulating apparatus 400. Similarly, other beverage characteristics or desired settings may be displayed on user interface 900.

In some exemplary embodiment of the subject matter, the user interface 900 may allow the user to determine configuration data or change customizable settings of the sip control application 508 of FIG. 5. For example, configuration data may include a first setting 940, a second setting 942 and a third setting 944. The first setting 940 may be determined or customized, for example, for when the user wishes to maintain a beverage at a predetermined hot temperature. Engagement of the first setting 940 by the user causes the electronic device 510 to transmit a command to the beverage sip regulating apparatus 400 to maintain the beverage at the predetermined hot temperature, for example 71 degrees Celsius.

A second setting 942 may be determined or customized, for example, for when the user wishes to maintain a beverage at a predetermined cold temperature. Engagement of the second setting 942 by the user causes the electronic device 510 to transmit a command to a processor, e.g. processor 402 of the beverage sip regulating apparatus 400 of FIG. 4, to maintain the beverage at the predetermined cold temperature, for example, 5 degrees Celsius.

A third setting 944 may be determined or customized, for example, for when the user wishes the beverage at a predetermined carbonization level, for example at 20% carbonization level of the beverage. Engagement of the third setting 944 by the user results in the electronic device 510 to transmit a command to the beverage sip regulating apparatus 400 to maintain the beverage at the predetermined carbonization level. In some non-limiting embodiments, the user interface 900 comprises a power consumption display 930, which may display, for example, remaining power level of the energy source (e.g. energy source 409 of FIG. 4), a power consumption rate or remaining amount of time till the battery is depleted, etc. For example the power display 930 shows that the power source is at 60% of its full capacity.

Figure 10:
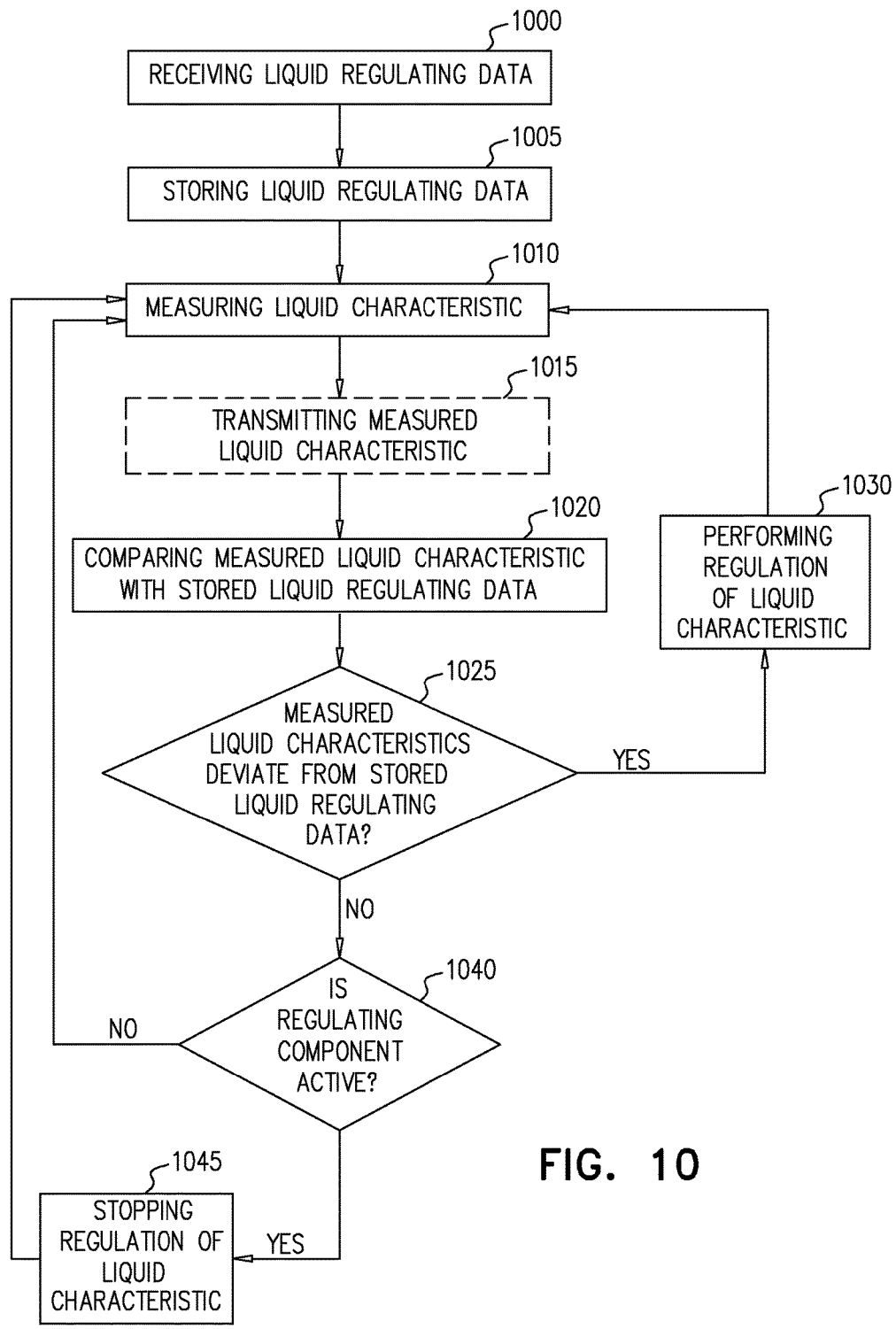

FIG. 10 illustrates a method for regulating a beverage's characteristics, according to some exemplary embodiments of the subject matter. Step 1000 discloses receiving beverage regulating data. In some cases, the beverage sip regulating apparatus 400 of FIG. 4 receives beverage regulating data from a remote device, e.g. electronic device 510 of FIG. 5. The beverage regulation data is customizable according to a preference of a user of the electronic device. The user of the electronic device 510 inputs the beverage regulating data, for example using user interface 900 of FIG. 9. The electronic device 510 transmits the beverage regulating data to the beverage sip regulating apparatus 400, which receives the beverage regulating data. The beverage regulating data may comprise a desired beverage temperature, carbonization level, pH level, or the like. For example, the beverage regulating data is received by the communication unit 406 of FIG. 4.

Step 1005 discloses storing the beverage regulating data. The beverage sip regulating apparatus 400 stores the beverage regulating data, which enables using the beverage sip regulating apparatus 400 to regulate the beverage characteristics according to the beverage regulating data. For example the beverage regulating data is stored in the storage unit 420 of beverage sip regulating apparatus 300 of FIG. 3. The stored regulating data comprises beverage settings, such as the beverage temperature, the beverage carbonization level, or the like.

Step 1010 discloses measuring a beverage characteristic. The beverage sip regulating apparatus 400 measures the beverage characteristic of the beverage stored inside the beverage sip regulating apparatus 400 to obtain the measured beverage characteristic. For example, the characteristic sensors 404 of FIG. 4 measure the beverage characteristic, such as a beverage temperature, of the beverage stored in the container lid.

Step 1015 discloses transmitting the measured beverage characteristic. The beverage sip regulating apparatus 400 transmits the measured beverage characteristic to the remote device, which enables the user of the remote device (e.g. device 510) to view the measured beverage characteristic and determine when the beverage is ready for consumption. For example, the measured beverage characteristic is the beverage temperature measured by the characteristic sensors 404. The beverage temperature is transmitted by the communication unit 406 of FIG. 4 to the electronic device 510. The beverage temperature is displayed for is the user in the user interface 900, which enables the user to determine whether the beverage is at a temperature at which the user wishes to consume the beverage, e.g. that tea in the container lid is 70 degrees Celsius. It should be noted that step 1015 is optional and is not required for performance of the method herein.

Step 1020 discloses comparing the measured beverage characteristic with a stored beverage characteristic. The stored beverage characteristic is one or more beverage characteristics stored in the beverage regulating data. The beverage sip regulating apparatus 400 compares the measured beverage characteristic with the stored beverage regulating data, which is a predetermined beverage characteristic value at which the user of the electronic device 510 wants the beverage to be at. For example, the stored beverage regulating data comprises the predetermined beverage characteristic of a carbonization level of 20%, which is compared with the measured beverage characteristic, which for example was measured to be 18%.

Step 1025 discloses determining whether the measured beverage characteristic deviates from the predetermined beverage characteristic. The beverage sip regulating apparatus 400 determines, for example, if a difference between the measured beverage characteristic and the predetermined beverage characteristic is greater than a predetermined deviation value. For example, where the beverage characteristic is the beverage temperature, the predetermined beverage characteristic may be a temperature deviation of two degrees Celsius. When the beverage temperature is lower or higher than a desired beverage temperature range, which is stored as the predetermined beverage characteristic. In some exemplary embodiments, the beverage regulating data may comprise the predetermined deviation value, which is inputted by the user of the electronic device 510 through the user interface 900.

In some cases the beverage sip regulating apparatus 400 determines the difference between the measured beverage characteristic and the predetermined beverage characteristic is less than the predetermined deviation value. For example, the regulating processor determines the carbonization of the beverage is at 19% carbonization where the predetermined deviation value is 2% and the stored beverage characteristic is 20%. In such a case, the beverage sip regulating apparatus 400 returns to step 1010 to measure the beverage characteristic.

Step 1030 discloses activating regulation of the beverage characteristic. Where the beverage sip regulating apparatus 400 determines the measured beverage characteristic deviates beyond the predetermined deviation value or a predetermined range of values, the regulating component 220 is activated, for example by the processor 402 of FIG. 4. For example, if the beverage in the beverage sip regulating apparatus 400 is beer, it may be preferably consumed at a cold temperature range. When the temperature of the beer rises above the predetermined deviation value, the regulating component 220 activates the temperature unit 221 of FIG. 2, which reduces the temperature of the beer in the beverage sip regulating apparatus 400 to the desired range. After activating the regulating component 220, the beverage sip regulating apparatus 400 repeats step 1010 to measure the beverage characteristic.

Step 1040 discloses determining whether the regulating component 220 is active when determining that the beverage characteristic deviates from the predetermined beverage characteristic. If the regulating component 220 is not regulating the beverage, the beverage sip regulating apparatus 400 returns step 1010 to measure the beverage characteristic. If the regulating component 220 is active, the beverage sip regulating apparatus 300 continues to perform step 1045.

Step 1045 discloses stopping regulation of the beverage. In some cases, if the regulating component 220 is active and the measured beverage characteristic is within the predetermined deviation value, the regulating component 220 is deactivated and the beverage sip regulating apparatus 400 returns to perform step 1010 to measure the beverage characteristic. More than one beverage characteristic may be measured, monitored and regulated. For example, the regulating component may regulate the beverage to maintain a preferred temperature and a preferred carbonization level. Each characteristic may be regulated independently of other characteristics.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or 'adapting' for an objective, or a variation thereof, implies using materials and/or components in a manner designed for and/or implemented and/or operable or operative to achieve the objective.

Unless otherwise specified, the terms 'about' and/or 'close' with respect to a magnitude or a numerical value implies within an inclusive range of −10% to +10% of the respective magnitude or value.

Unless otherwise specified, the terms 'about' and/or 'close' with respect to a dimension or extent, such as length, implies within an inclusive range of −10% to +10% of the respective dimension or extent.

Unless otherwise specified, the terms 'about' or 'close' imply at or in a region of, or close to a location or a part of an object relative to other parts or regions of the object.

When a range of values is recited, it is merely for convenience or brevity and includes all the possible subranges as well as individual numerical values within and about the boundary of that range. Any numeric value, unless otherwise specified, includes also practical close values enabling an embodiment or a method, and integral values do not exclude fractional values. A sub-range values and practical close values should be considered as specifically disclosed values.

As used herein, ellipsis ( . . . ) between two entities or values denotes an inclusive range of entities or values, respectively. For example, A . . . Z implies all the letters from A to Z, inclusively.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

Terms in the claims that follow should be interpreted, without limiting, as characterized or described in the specification.

While the disclosure has been described with reference to exemplary embodiments, it will be understood by those skilled in the art that various changes may be made and equivalents may be substituted for elements thereof without departing from the scope of the subject matter. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this subject matter, but only by the claims that follow.

The invention claimed is:

1. A beverage sip regulating apparatus connectable to a top portion of a beverage container, the beverage sip regulating apparatus comprising:
   an entrance port configured to be located over a port at the top of the beverage container, through which beverage enters the beverage sip regulating apparatus;
   a beverage compartment configured to receive and store a sip amount of beverage from the beverage container; and
   a regulation system for regulating one or more predetermined characteristics of the sip amount of beverage stored in the beverage compartment, the regulation system comprising a temperature controller to regulate the temperature of the sip amount of beverage stored in the beverage compartment,
   wherein the regulation system further comprises:
      a temperature plate between the controller and the beverage compartment; and
      one or more air vents and a fan configured to disperse heat generated by the temperature controller out of the beverage sip regulating apparatus through the one or more air vents.

2. The beverage sip regulating apparatus of claim 1, wherein the regulation system further comprises:
   a processor to control operation of electronic components of the beverage sip regulating apparatus;
   one or more characteristic sensors to measure one or more predetermined characteristics of the beverage;
   an energy source for powering the electronic components of the apparatus.

3. The beverage sip regulating apparatus of claim 2, further comprising a communication unit to receive configuration data from an electronic device, the configuration data comprising desired beverage characteristic settings for beverage contained in the beverage sip regulating apparatus or usage settings of said apparatus.

4. The beverage sip regulating apparatus of claim 2, further comprising a user interface to enable input of configuration data for regulating the beverage in the beverage compartment.

5. The beverage sip regulating apparatus of claim 4, wherein the user interface displays the configuration data for regulating the beverage.

6. The beverage sip regulating apparatus of claim 1, wherein the apparatus is connectable to a top portion of the beverage container.

7. The beverage sip regulating apparatus of claim 6, comprising a clamping element to connect to a rim of the beverage container.

8. The beverage sip regulating apparatus of claim 1, wherein the predetermined characteristic is a temperature of the beverage.

9. The beverage sip regulating apparatus of claim 1, wherein the predetermined characteristic is a carbonization level of the beverage.

10. The beverage sip regulating apparatus of claim 1, wherein the predetermined characteristic is a pH level of the beverage.

* * * * *